United States Patent [19]
Yeager

[11] 3,940,843
[45] Mar. 2, 1976

[54] METHOD OF FORMING AN EXTENSION TUBE ASSEMBLY

[75] Inventor: William J. Yeager, Alden, N.Y.

[73] Assignee: R. E. Chapin Manufacturing Works, Inc., Batavia, N.Y.

[22] Filed: Dec. 16, 1974

[21] Appl. No.: 532,894

[52] U.S. Cl. .................. 29/437; 29/511; 285/354
[51] Int. Cl.² ........................................ B23P 11/00
[58] Field of Search ............ 285/354, 386, 23, 280, 285/281, 379; 29/434, 509, 511, 517, 437, 439

[56] References Cited
UNITED STATES PATENTS

| | | | |
|---|---|---|---|
| 1,540,906 | 6/1925 | Schweinert | 285/354 X |
| 2,409,283 | 10/1946 | Hudson | 285/354 X |
| 2,427,260 | 9/1947 | Cowles | 285/354 X |

Primary Examiner—H. Hampton Hunter
Assistant Examiner—Wayne L. Shedd
Attorney, Agent, or Firm—Bean & Bean

[57] ABSTRACT

An extension tube assembly is provided with a swivel coupling permitting selective angular adjustment thereof relative to a hand manipulated shut-off valve device of a compressed air sprayer unit, thereby to facilitate accurate "pointing" of a spray discharge nozzle carried by the assembly. A method of assembling the coupling is disclosed.

1 Claim, 4 Drawing Figures

U.S. Patent  March 2, 1976  3,940,843
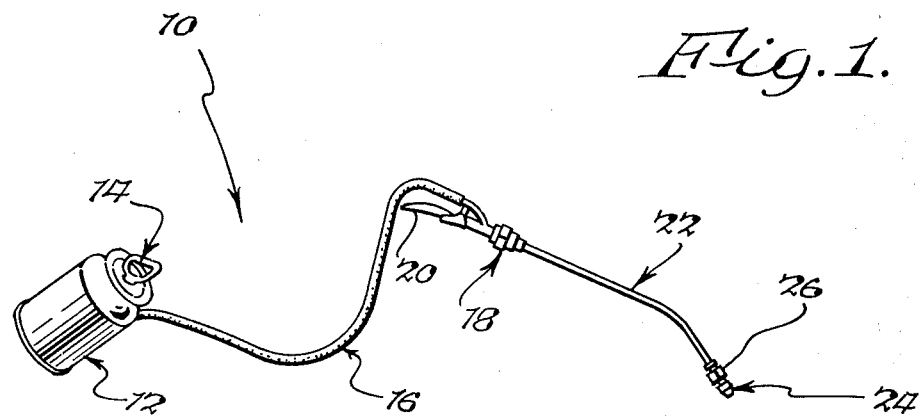
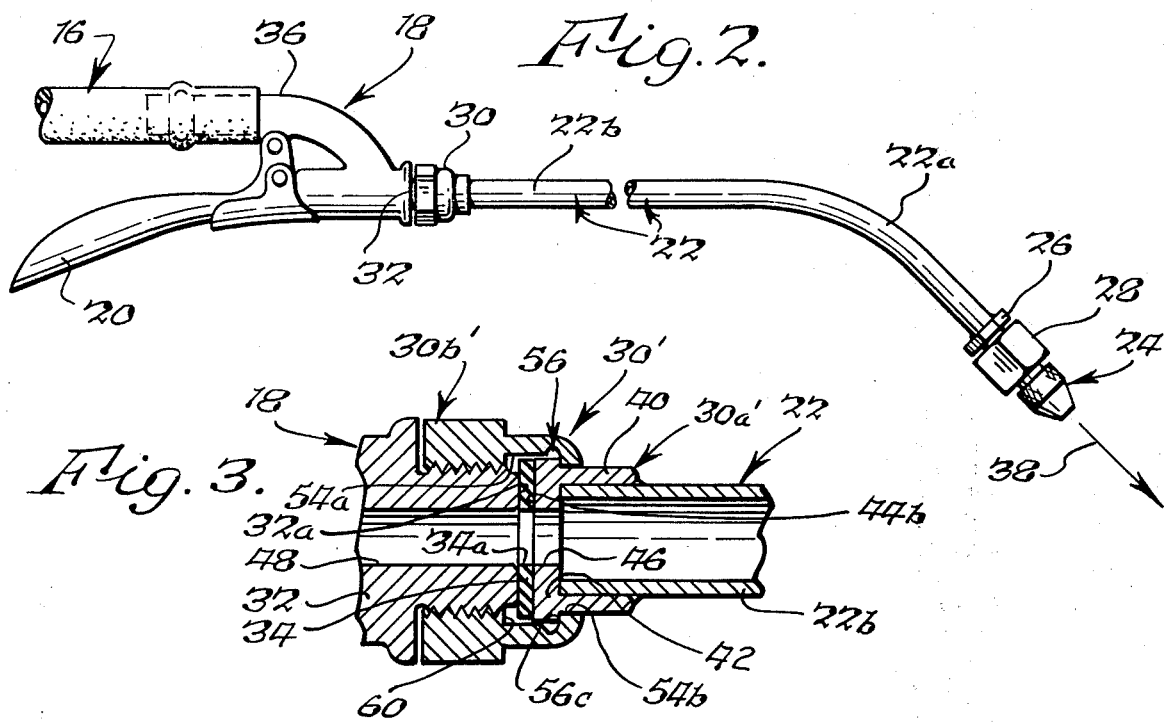
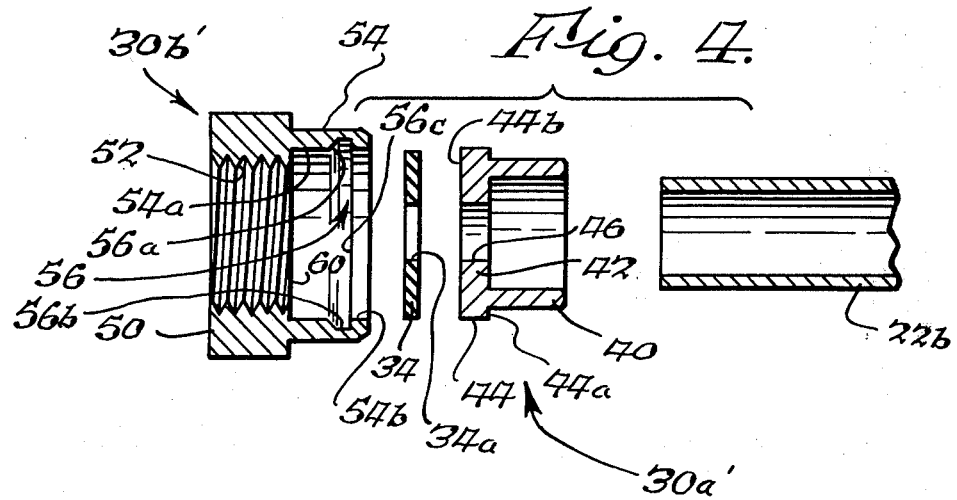

METHOD OF FORMING AN EXTENSION TUBE ASSEMBLY

SUMMARY OF THE INVENTION

The present invention generally relates to the field of discharge nozzle carrying extension tubes for use with compressed air sprayers. More particularly, the present invention relates to an improved arrangement for adjustably mounting the extension tube on a manually manipulated shut-off valve whereby to facilitate accurate pointing of the nozzle towards an object to be sprayed.

In accordance with the present invention, the extension tube is removably fixed to shut-off valve device or other manually manipulated discharge nozzle pointing device by means of a "swivel" coupling permitting ready adjustment of the angular orientation of the extension tube and thus the discharge nozzle relative to such valve device. The disclosed mode of fabricating or assembling the coupling permits a joint sealing gasket to be retained as a permanent part of the extension tube assembly.

DRAWINGS

FIG. 1 is a perspective view of a compressed air type spraying unit with which the present invention possesses utility;

FIG. 2 is an enlarged side elevational view of a portion of the unit shown in FIG. 1;

FIG. 3 is a sectional view taken through an extension tube coupling formed in accordance with the present invention; and FIG. 4 is an exploded view of elements of the coupling shown in FIG. 3 prior to assembly.

DETAILED DESCRIPTION

To facilitate description of the construction and mode of operation of the present invention, reference is first made particularly to FIG. 1, wherein 10 designates a compressed air type spraying unit. Sprayer 10 is conventional from the standpoint that it includes a tank 12 having a manually operated pump 14, a flexible hose or flow conduit 16; a shut-off valve 18 having a manually operated valve control lever 20; an extension tube 22; and a spray nozzle 24. In use, tank 12 is normally suspended from the shoulder of an operator by means of a strap, not shown, and discharge of spray through nozzle 24 is controlled by operation of control lever 20; manual manipulations of the whole of shut-off valve 18 being employed to "point" the nozzle in order to control the direction of discharge of the spray.

In conventional sprayer units of the type illustrated in FIGS. 1 and 2, an externally threaded coupling 26 is rigidly fixed, as by soldering, to the front end of tube 22 for removably receiving an internally threaded or cup-shaped end 28 of nozzle 24; and an internally threaded coupling 30 is rigidly fixed, as by soldering, to the rear end of tube 22 for removably receiving an externally threaded nipple 32 extending forwardly from shut-off valve 18. Normally, a suitable sealing ring or gasket 34, shown only in FIGS. 3 and 4, is removably associated with coupling 30 to prevent leakage of fluid through the screw thread joint. This type of construction is normally quite acceptable when tube 22 is of a straight line construction or configuration. However, extension tubes are ofttimes bent or curved to define angularly arranged front and rear portions 22a and 22b, respectively, in order to facilitate control of the direction of discharge of the spray. With this latter type of construction, it is necessary to maintain strict manufacturing tolerances in connection with the threading of nipple 32 and coupling 30, as well as the mounting of coupling 30 on tube portion 22b and the thickness of gasket 34. Otherwise, it is unlikely that tube 22 will be properly oriented relative to shut-off valve 18 when screwed together sufficiently to achieve a proper fluid seal therebetween. In this respect, it will be understood that it is normal practice to grip shut-off valve 18, such that its inlet conduit or nipple part 36 is engaged with the palm of the operator's hand, while the operator's fingers squeeze control lever 20 to open the shut-off valve in order to place tank 12 in communication with nozzle 24. This manner of gripping shut-off valve 18 results in the natural pointing of nozzle 24 towards an intended point of application of the spray only when tube portion 22b is rotatably orientated relative to nipple 32, such as to arrange the spray discharge path, designated by arrow 38, to lie essentially within a "reference" or operator chosen plane, which may be considered as approximately lengthwise bisecting shut-off valve lever 20 and inlet conduit 36. This in effect requires that tube portion 22b be rotatably oriented such that the whole of tube 22 is lengthwise bisected by this reference plane, since the front portion 22a and the spray discharge path are essentially coaxially arranged. As a practical matter, the orientation of this reference plane relative to shut-off valve 18 may vary between operators depending on individual hand sizes and shut-off gripping mannerisms. Thus, even with prior "top of the line" spraying units known for their maintenance of strict manufacturing tolerances, proper pointing of nozzle 24 was not always achieved in actual practice.

The present invention features an improved arrangement for connecting tube end portion 22b to shut-off valve nipple 32, whereby to permit selective operator adjustments of the tube 22 for achieving desired orientations of nozzle 24 relative to such operator's particular reference plane. Moreover, this may be achieved with the maintenance of minimal manufacturing tolerances and without greatly increasing the complexity and cost of tube fabrication.

Now with reference to FIGS. 3 and 4, it will be understood that the present invention features the provision of a swivel coupling 30' to adjustably connect tube rear portion 22b to shut-off valve nipple 32. Coupling 30' is of two part construction including a swivel cap adapter or mounting member 30a' and a swivel cap 30b'. In the preferred form of the invention, adapter 30a' is of a generally cup-shaped configuration including a forwardly disposed sleeve portion 40, which is dimensioned to be slip fitted over the end of tube rear portion 22b; and an integrally formed, rearwardly disposed base portion 42, which includes an annular mounting flange 44 extending radially outwardly of sleeve 40. Flange 44 has a forwardly facing bearing surface 44a and a rearwardly facing sealing surface 44b. Base portion 42 is also formed with a centrally disposed or axially through bore opening 46 having a diameter preferably corresponding to that of shut-off valve flow passageway 48. The inner surface of sleeve portion 40 is permanently fluid sealed and rigidly fixed to the tube end, as by soldering or a suitable adhesive.

By now referring particularly to FIG. 4, it will be understood that, as formed, swivel cap 30b' includes a rearwardly disposed, hexagonally shaped base portion 50, which is provided with a threaded axially extending through opening 52 dimensioned to threadably receive nipple 32; and a forwardly and co-axially extending, integrally formed mounting sleeve portion 54, which has its cylindrically shaped inner surface axially divided into rear and front bearing portions 54a and 54b, respectively, by a groove or undercut 56. As formed, groove 56 includes a forwardly and radially outwardly flaired clearance surface 56a, and essentially cylindrically shaped intermediate clearance surface 56b and an essentially radially extending and rearwardly facing abutment or stop surface 56c. The internal diameter of sleeve 54 as formed exceeds the diameter of threaded opening 52, so as to cooperate therewith in defining an annular abutment or stop surface 60; such sleeve diameter being sufficient to slidably and rotatably accommodate mounting flange 44.

Previously mentioned gasket or sealing ring 34 is formed with a diameter approximating that of adapter mounting flange 44 and has a centrally disposed through opening 34a essentially corresponding to the diamter of bore opening 46.

By again referring to FIGS. 3 and 4, it will be understood that coupling 30' is assembled by a procedure including the steps of successively inserting gasket 34 and adapter base portion 42 into sleeve portion 54 and thereafter progressively inwardly deforming the forwardly disposed end of sleeve portion 54, as by a rolling operation. When the deforming operation is completed, the forward end of sleeve portion 54 is of a relatively reduced diameter with groove surface 56c positioned in a facing justaposed relationship with bearing surface 44a and inner surface bearing portion 54b positioned to slidably and rotatably accommodate adapter sleeve portion 40 in the manner illustrated in FIG. 3. Surfaces 56c and 54b may depart slightly from their preferred radial and cylindrical configurations illustrated in the drawing without adversely effecting operation of coupling 30'. Groove 56 thus serves to define surface 56c; to provide for controlled "weakening" of the annular portion of sleeve 54 at which deformation thereof is to occur; and to afford radial clearance between the inner surface of sleeve 54 adjacent surface 56c and the outer surface of flange 44 subsequent to the deforming operation. Adapter sleeve 40 may be affixed to tube rear portion 22b, either before or after the coupling assembly operation.

When the above described assembly operation is completed, stop surfaces 60 and 56c cooperate to permanently lock or retain gasket 34 and adapter 30a' within sleeve portion 54, while permitting slight axial displacement and rotational movements thereof relative to each other and sleeve portion 54.

When swivel cap 30b' is threaded onto nipple 32, the nipple cooperates with stop surface 56c for the purpose of clamping gasket 34 in fluid sealing engagement with both the front or radially disposed surface 32a of the nipple and surface 44b of adapter 30a'. Desired rotational adjustments of tube 22 relative to nipple 32 and thus valve 18 may be effected at any time before final fluid seal clamping of gasket 34.

With the disclosed coupling construction, tube 22 may be accurately orientated and effectively fluid sealed relative to shut-off valve 18 without the necessity of maintaining excessively strict manufacturing tolerances.

While the extension tube assembly of the present invention has been described with reference to its use with a particular type of compressed air sprayer and in this connection as being fixed to a shut-off valve pointing device, it will be appreciated that the present extension tube assembly possesses utility with sprayer units other than that specifically described.

I claim:

1. A method of assembling a coupling for use in adjustably-removably attaching an inlet end of a tube to an externally threaded fluid discharge nipple, which comprises:

providing a swivel cap having a base portion provided with a through opening threaded to receive said nipple and an integrally formed sleeve portion extending coaxially forwardly of said base portion and having an internal diameter in excess of the diameter of said through opening thereby to define a forwardly facing annular first stop surface;

forming an annular groove in the inner surface of said sleeve portion whereby to divide said inner surface into relatively rear and forward bearing surfaces and to define within said groove a rearwardly facing and essentially radially extending annular second stop surface;

providing a swivel cap adapter having a base and integral formed sleeve extending co-axially forwardly of said base, said base having a centrally disposed flow opening therethrough and an annular flange extending radially outwardly of said sleeve and defining a rearwardly facing sealing surface and a forwardly facing annular bearing surface, said flange having a diameter in excess of said threaded opening and dimensioned to be slidably and rotatably accommodated within said sleeve portion;

providing a sealing ring having a diameter corresponding essentially to said flange diameter and a centrally disposed through flow opening;

successively inserting said sealing ring and said swivel cap adapter into said sleeve portion to position said sealing ring adjacent said first stop surface and said flange sealing surface adjacent said sealing ring with said sealing ring and said flange in essential radial alignment with said rear bearing surface of said inner surface;

deforming said sleeve portion to radially inwardly displace portions thereof forwardly of said groove for positioning said second stop surface in facing juxtaposed relationship to said flange bearing surface and for positioning said forward bearing surface of said inner surface to slidably and rotatably receive said sleeve, thereby to permanently retain said sealing ring and said swivel cap adapter within said sleeve portion axially intermediate said first and second stop surfaces with said flow openings in essential alignment with said threaded opening; and permanently affixing said sleeve in fluid seal relationship to said tube inlet end to position said base flow opening in flow communication with said tube.

* * * * *